US012228934B2

(12) United States Patent
Liu et al.

(10) Patent No.: US 12,228,934 B2
(45) Date of Patent: Feb. 18, 2025

(54) COLLISION AVOIDANCE METHOD AND APPARATUS FOR MOVING DEVICE, AND COMPUTER-READABLE STORAGE MEDIUM

(71) Applicant: Keenon Robotics Co., Ltd., Shanghai (CN)

(72) Inventors: Yuhao Liu, Shanghai (CN); Meihua Zhang, Shanghai (CN); Shiteng Wang, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 358 days.

(21) Appl. No.: 17/848,662

(22) Filed: Jun. 24, 2022

(65) Prior Publication Data
US 2022/0326712 A1  Oct. 13, 2022

Related U.S. Application Data

(63) Continuation of application No. PCT/CN2021/137415, filed on Dec. 13, 2021.

(30) Foreign Application Priority Data

Mar. 2, 2021 (CN) .......................... 202110231016.3

(51) Int. Cl.
G05D 1/00 (2024.01)
(52) U.S. Cl.
CPC .................. G05D 1/0214 (2013.01)
(58) Field of Classification Search
CPC ........ B25J 9/1666; B25J 13/089; B25J 9/161; B25J 9/1676; G05D 1/0214;
(Continued)

(56) References Cited

U.S. PATENT DOCUMENTS

2009/0234527 A1    9/2009  Ichinose et al.
2010/0019934 A1*   1/2010  Takano .............. B62D 15/0275
                                            340/932.2
(Continued)

FOREIGN PATENT DOCUMENTS

CN    109108974 A    1/2019
CN    109144065 A    1/2019
(Continued)

OTHER PUBLICATIONS

Sun, Xuehao, Shuchao Deng, and Baohong Tong. "Trajectory planning approach of mobile robot dynamic obstacle avoidance with multiple constraints." 2021 6th IEEE International Conference on Advanced Robotics and Mechatronics (ICARM). IEEE, 2021. ( Year: 2021).*

(Continued)

*Primary Examiner* — Russell Frejd
*Assistant Examiner* — Ana D Thomas
(74) *Attorney, Agent, or Firm* — Westbridge IP LLC (57) ABSTRACT

Disclosed are a collision avoidance method for a moving device, a collision avoidance apparatus for a moving device, and a computer-readable storage medium. This application relates to the field of artificial intelligence technologies. According to the method, a parking direction of a moving device in an avoidance area is adjusted, so that a startup time used by the moving device after avoidance completes may be reduced. The method includes: determining a target path direction of a moving device; determining a first candidate parking direction and a second candidate parking direction; determining, based on the target path direction, a target parking direction of the moving device from the first candidate parking direction and the second candidate parking direction; and controlling, based on the target parking direction, the moving device to be parked in the avoidance area.

18 Claims, 5 Drawing Sheets

(58) Field of Classification Search
CPC ........... G05B 2219/33027; G05B 2219/39082; G05B 2219/40317; G05B 2219/40339; G05B 2219/40476

See application file for complete search history.

(56) References Cited

U.S. PATENT DOCUMENTS

| | | | |
|---|---|---|---|
| 2019/0381662 A1 | 12/2019 | Taira et al. | |
| 2020/0081443 A1 | 3/2020 | Nakata | |
| 2021/0166572 A1* | 6/2021 | Kim | G06T 13/20 |

FOREIGN PATENT DOCUMENTS

| | | |
|---|---|---|
| CN | 110083157 A | 8/2019 |
| CN | 110377038 A | 10/2019 |
| CN | 112083728 A | 12/2020 |
| CN | 112405533 A | 2/2021 |
| CN | 113103224 A | 7/2021 |
| JP | 2000089826 A | 3/2000 |
| JP | 2005209225 A | 8/2005 |
| JP | 2010055496 A | 3/2010 |
| JP | 2011248713 A | 12/2011 |
| JP | 2019087210 A | 6/2019 |

OTHER PUBLICATIONS

Alexopoulos, Alexander, et al. "A comparative study of collision avoidance techniques for unmanned aerial vehicles." 2013 IEEE international conference on systems, man, and cybernetics. IEEE, 2013. (Year: 2013).*

Hashim, Mohd Sani Mohamad, Tien-Fu Lu, and Hassrizal Hassan Basri. "Dynamic obstacle avoidance approach for car-like robots in dynamic environments." 2012 International Symposium on Computer Applications and Industrial Electronics (ISCAIE). IEEE, 2012. (Year: 2012).*

First Office Action issued in counterpart Chinese Patent Application No. 202110231016.3, dated Mar. 14, 2022.

International Search Report issued in corresponding PCT Application No. PCT/CN2021/137415, dated Feb. 24, 2022.

Written Opinion issued in corresponding PCT Application No. PCT/CN2021/137415, dated Feb. 24, 2022.

Extended European Search Report issued in counterpart European Patent Application No. 21887877.5, dated Dec. 23, 2022.

* cited by examiner

COLLISION AVOIDANCE METHOD AND APPARATUS FOR MOVING DEVICE, AND COMPUTER-READABLE STORAGE MEDIUM

CROSS-REFERENCE TO RELATED APPLICATIONS

This disclosure is a continuation of International Application No. PCT/CN2021/137415, filed on Dec. 13, 2021, which claims priority to Chinese Patent Application No. 202110231016.3, filed on Mar. 2, 2021. Both applications are incorporated herein by reference in their entireties.

TECHNICAL FIELD

Embodiments of the present application relates to the field of artificial intelligence technologies, and in particular, to a collision avoidance method for a moving device, a collision avoidance apparatus for a moving device, and a computer-readable storage medium.

BACKGROUND

With the rapid development of artificial intelligence technologies, robots become widely used. It is likely that a plurality of robots are deployed in one application scenario. In this case, there are conflicts in navigation paths of the plurality of robots. When there is a conflict between navigation paths of two robots, the robot with a lower priority may be set to perform avoidance. However, in the existing avoidance method, a startup time used by the robot is too long after the avoidance completes.

SUMMARY

The present application provides a collision avoidance method for a moving device, a collision avoidance apparatus for a moving device, and a computer-readable storage medium, which may reduce a startup time used by a moving device after avoidance completes.

To achieve the foregoing objective, the present application provides the following technical solutions:

According to a first aspect, the present application provides a collision avoidance method for a moving device, which may be applied to a collision avoidance apparatus for a moving device and includes: determining a target path direction of a moving device; determining a first candidate parking direction and a second candidate parking direction; determining, based on the target path direction, a target parking direction of the moving device from the first candidate parking direction and the second candidate parking direction; and controlling, based on the target parking direction, the moving device to be parked in the avoidance area. The target path direction is a direction of a navigation path to be used after the moving device is parked in an avoidance area.

Optionally, in a possible design manner, the "determining a first candidate parking direction and a second candidate parking direction" may include: determining a channel width of a preset movement area of the moving device; and determining the first candidate parking direction and the second candidate parking direction based on a boundary of the avoidance area and the channel width, where the avoidance area belongs to a range of the preset movement area.

Optionally, in another possible design manner, the "determining the first candidate parking direction and the second candidate parking direction based on a boundary of the avoidance area and the channel width" may include: when it is determined that the channel width is greater than a preset length, determining two different directions parallel to the boundary of the avoidance area as the first candidate parking direction and the second candidate parking direction, respectively.

Optionally, in another possible design manner, the "determining the first candidate parking direction and the second candidate parking direction based on a boundary of the avoidance area and the channel width" may include: when it is determined that the channel width is less than or equal to a preset length, determining the first candidate parking direction and the second candidate parking direction based on a positional relationship between a straight line where a physical long axis of the moving device is located and a straight line where a movement direction of the moving device is located.

Optionally, in another possible design manner, the "determining the first candidate parking direction and the second candidate parking direction based on a positional relationship between a straight line where a physical long axis of the moving device is located and a straight line where a movement direction of the moving device is located" may include:

when the straight line where the physical long axis is located and the straight line where the movement direction is located are parallel to each other, determining two different directions parallel to the boundary of the avoidance area as the first candidate parking direction and the second candidate parking direction, respectively.

Optionally, in another possible design manner, the "determining the first candidate parking direction and the second candidate parking direction based on a positional relationship between a straight line where a physical long axis of the moving device is located and a straight line where a movement direction of the moving device is located" may include:

when the straight line where the physical long axis is located and the straight line where the movement direction is located are perpendicular to each other, determining two different directions perpendicular to the boundary of the avoidance area as the first candidate parking direction and the second candidate parking direction, respectively.

Optionally, in another possible design manner, the "determining the first candidate parking direction and the second candidate parking direction" may include:

determining a target parking area, where the target parking area does not belong to a range of a preset movement area;

identifying a target boundary, where the target boundary is a boundary, closest to the moving device, within the target parking area; and determining two different directions parallel to the target boundary as the first candidate parking direction and the second candidate parking direction, respectively.

Optionally, in another possible design manner, the "controlling, based on the target parking direction, the moving device to be parked in the avoidance area" may include: controlling the moving device to be parked in the avoidance area with a movement direction toward the target parking direction.

Optionally, in another possible design manner, the "determining, based on the target path direction, a target parking direction of the moving device from the first candidate parking direction and the second candidate parking direction" may include:

determining a first direction angle and a second direction angle, where the first direction angle is an angle between the first candidate parking direction and the target path direction, and the second direction angle is an angle between the second candidate parking direction and the target path direction; and determining, based on the first direction angle and the second direction angle, the target parking direction from the first candidate parking direction and the second candidate parking direction.

Optionally, in another possible design manner, the "determining, based on the first direction angle and the second direction angle, the target parking direction from the first candidate parking direction and the second candidate parking direction" may include:

when the first direction angle is less than the second direction angle, determining that the first candidate parking direction is the target parking direction; when the first direction angle is greater than the second direction angle, determining that the second candidate parking direction is the target parking direction; and when the first direction angle is equal to the second direction angle, determining that the first candidate parking direction or the second candidate parking direction is the target parking direction.

According to a second aspect, the present application provides a collision avoidance apparatus for a moving device, including a determining module and a control module.

The determining module is configured to determine a target path direction of a moving device, where the target path direction is a direction of a navigation path to be used after the moving device is parked in an avoidance area.

The determining module is further configured to determine a first candidate parking direction and a second candidate parking direction.

The determining module is further configured to determine, based on the target path direction, a target parking direction of the moving device from the first candidate parking direction and the second candidate parking direction.

The control module is configured to control, based on the target parking direction determined by the determining module, the moving device to be parked in the avoidance area.

Optionally, in a possible design manner, the determining module is specifically configured to: determine a channel width of a preset movement area of the moving device; and determine the first candidate parking direction and the second candidate parking direction based on a boundary of the avoidance area and the channel width. The avoidance area belongs to a range of the preset movement area.

Optionally, in another possible design manner, the determining module is further specifically configured to: when it is determined that the channel width is greater than a preset length, determine two different directions parallel to the boundary of the avoidance area as the first candidate parking direction and the second candidate parking direction, respectively.

Optionally, in another possible design manner, the determining module is further specifically configured to: when it is determined that the channel width is less than or equal to a preset length, determine the first candidate parking direction and the second candidate parking direction based on a positional relationship between a straight line where a physical long axis of the moving device is located and a straight line where a movement direction of the moving device is located.

Optionally, in another possible design manner, the determining module is further specifically configured to: when the straight line where the physical long axis is located and the straight line where the movement direction is located are parallel to each other, determine two different directions parallel to the boundary of the avoidance area as the first candidate parking direction and the second candidate parking direction, respectively.

Optionally, in another possible design manner, the determining module is further specifically configured to: when the straight line where the physical long axis is located and the straight line where the movement direction is located are perpendicular to each other, determine two different directions perpendicular to the boundary of the avoidance area as the first candidate parking direction and the second candidate parking direction, respectively.

Optionally, in another possible design manner, the determining module is further specifically configured to: determine a target parking area, where the target parking area does not belong to a range of a preset movement area; identify a target boundary, where the target boundary is a boundary, closest to the moving device, within the target parking area; and determine two different directions parallel to the target boundary as the first candidate parking direction and the second candidate parking direction, respectively.

Optionally, in another possible design manner, the control module is specifically configured to control the moving device to be parked in the avoidance area with a movement direction toward the target parking direction.

Optionally, in another possible design manner, the determining module is further specifically configured to: determine a first direction angle and a second direction angle, where the first direction angle is an angle between the first candidate parking direction and the target path direction, and the second direction angle is an angle between the second candidate parking direction and the target path direction; and determine, based on the first direction angle and the second direction angle, the target parking direction from the first candidate parking direction and the second candidate parking direction.

Optionally, in another possible design manner, the determining module is further specifically configured to: when the first direction angle is less than the second direction angle, determine that the first candidate parking direction is the target parking direction; when the first direction angle is greater than the second direction angle, determine that the second candidate parking direction is the target parking direction; and when the first direction angle is equal to the second direction angle, determine that the first candidate parking direction or the second candidate parking direction is the target parking direction.

According to a third aspect, the present application provides a collision avoidance apparatus for a moving device, including a memory, a processor, a bus and a communications interface. The memory is configured to store computer executable instructions, and the processor and the memory are connected through the bus. When the collision avoidance apparatus for a moving device is running, the processor executes the computer executable instructions stored in the memory, so that the collision avoidance apparatus for a moving device performs the collision avoidance method for a moving device according to the first aspect.

Optionally, the collision avoidance apparatus for a moving device may further include a transceiver. The transceiver is configured to: under the control of the processor of the collision avoidance apparatus for a moving device, perform steps of sending and receiving data, signaling or information, for example, obtain a target path direction.

Optionally, the collision avoidance apparatus for a moving device may be a moving device itself, or part of apparatus in a moving device, for example, may be a chip system in the moving device. The chip system is configured to support the collision avoidance apparatus for a moving device in implementing functions involved in the first aspect, for example, receiving, sending or processing data and/or information involved in the collision avoidance method for a moving device. The chip system includes a chip, or may include another discrete device or circuit structure.

Optionally, the collision avoidance apparatus for a moving device may alternatively be a server communicatively connected to a moving device, or may be part of apparatus in the server, for example, may be a chip system in the server.

According to a fourth aspect, the present application provides a computer-readable storage medium. The computer-readable storage medium stores instructions. When executing the instructions, a computer performs the collision avoidance method for a moving device according to the first aspect.

According to a fifth aspect, the present application provides a computer program product. The computer program product includes computer instructions. When the computer instructions are run on a computer, the computer performs the collision avoidance method for a moving device according to the first aspect.

It should be noted that some or all of the computer instructions may be stored in a computer-readable storage medium. The computer-readable storage medium may be packaged together with a processor of the collision avoidance apparatus for a moving device, or may be packaged separately with the processor of the collision avoidance apparatus for a moving device, which is not limited in the present application.

According to the collision avoidance method for a moving device provided in the present application, a direction of a moving device used when the moving device is parked in an avoidance area (namely, the target parking direction in the present application) is determined based on a target path direction, and the target path direction is a direction of a navigation path to be used after the moving device is parked in the avoidance area. Therefore, according to the technical solution of the present application, a target parking direction that matches the direction of the navigation path may be determined from two candidate parking directions, that is, there is a relatively small angle difference between the direction of the navigation path and the target parking direction. In this way, after the moving device is parked in the avoidance area, the moving device may quickly adjust its body to the direction of the navigation path. Therefore, the collision avoidance method for a moving device provided in the present application may reduce a startup time used by the moving device after the avoidance completes.

For descriptions of the second, third, fourth, and fifth aspects of the present application, reference may be made to the detailed description of the first aspect. In addition, for beneficial effects of the descriptions of the second, third, fourth, and fifth aspects, reference may be made to the beneficial effect analysis of the first aspect. Details are not described herein again.

In the present application, a name of the collision avoidance apparatus for a moving device does not constitute any limitation on the device or function modules themselves. In an actual implementation, the devices or function modules may be used with other names, as long as functions of the devices or function modules are similar to those of the present application and fall within the scope of the claims of the present application and its equivalent technologies.

These aspects or other aspects of the present application are clearer and easier to understand in the following descriptions.

DETAILED DESCRIPTION OF THE EMBODIMENTS

The following describes in detail a collision avoidance method for a moving device, a collision avoidance apparatus for a moving device, and a computer-readable storage medium provided by embodiments of the present application with reference to the accompanying drawings.

In this specification, the term "and/or" is merely an association relationship that describes associated objects, and represents that there may be three relationships. For example, A and/or B may represent three cases: only A exists, both A and B exist, and only B exists.

In the specification and drawings of the present application, the terms such as "first" and "second" are used to distinguish between different objects, or to distinguish between different processing of a same object, rather than describing a particular sequence of the objects.

In addition, the terms "include" and "comprise" and any variation thereof mentioned in the description of the present application are intended to cover non-exclusive inclusion. For example, a process, method, system, product, or device that includes a series of steps or units is not necessarily limited to those listed steps or units, but optionally further includes other steps or units that are not listed or inherent to such a process, method, system, product, or device.

It should be noted that, in the embodiments of the present application, words such as "exemplary" or "for example" are used to indicate an example, an instance, or descriptions. Any embodiment or design solution described as "exemplary" or "for example" in the embodiments of the present application should not be construed as being preferable or advantageous than other embodiments or design solutions. Specifically, the words such as "exemplary" or "for example" are used to present related concepts in a specific manner.

In the description of the present application, unless otherwise specified, "a plurality of" means two or more.

With the rapid development of artificial intelligence technologies, robots become widely used. It is likely that a plurality of robots are deployed in one application scenario. In this case, there are conflicts in navigation paths of the plurality of robots. When there is a conflict between navigation paths of two robots, a robot with a lower priority may be allowed to be parked in a preset avoidance area, or move into the nearest fork for avoidance, so as to implement the avoidance.

However, in the foregoing avoidance method, after the avoidance completes, the robot usually needs to re-adjust its body to a direction of a navigation path. As a result, a startup time used by the robot is too long after the avoidance completes.

In response to the foregoing problem, an embodiment of the present application provides a collision avoidance method for a moving device. According to the method, a parking direction of a moving device in an avoidance area is adjusted, so that after the moving device is parked in the avoidance area, a body of the moving device may be quickly adjusted to a direction of a navigation path, and thus a startup time used by the moving device after the avoidance completes may be reduced.

The collision avoidance method for a moving device provided by the embodiment of the present application may be applied to a collision avoidance apparatus for a moving device. In a possible implementation, the collision avoidance apparatus for a moving device may be a moving device itself or a chip system in the moving device.

For example, the moving device first determines a target path direction, a first candidate parking direction, and a second candidate parking direction. Then, the moving device determines, based on the target path direction, a target parking direction from the first candidate parking direction and the second candidate parking direction. Finally, the moving device controls, based on the target parking direction, itself to be parked in an avoidance area.

In another possible implementation, the collision avoidance apparatus for a moving device may alternatively be a server communicatively connected to the moving device.

Figure 1:
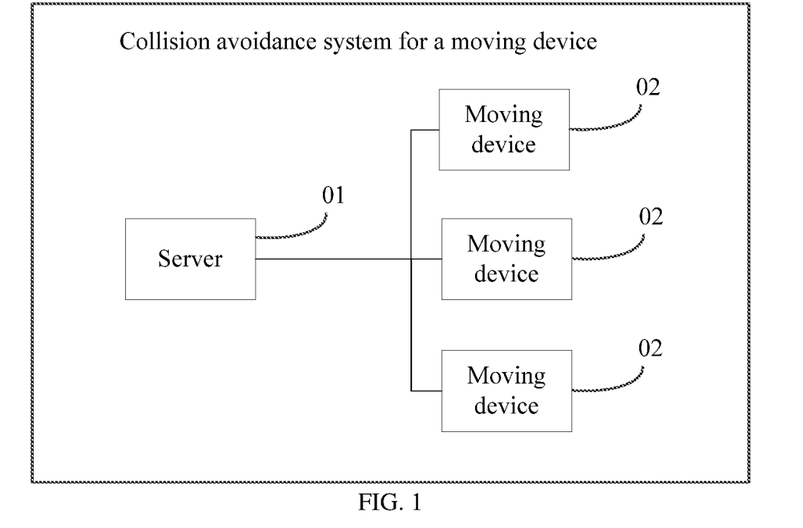
FIG. 1 is a schematic architectural diagram of a collision avoidance system for a moving device according to an embodiment of the present application.

FIG. 1 is a schematic architectural diagram of a collision avoidance system for a moving device according to an embodiment of the present application.

For example, referring to FIG. 1, the collision avoidance system for a moving device includes a server 01 and at least one moving device 02. The server 01 is connected to each moving device 02.

The server 01 is configured to: determine navigation paths for a plurality of moving devices 02 in the collision avoidance system for a moving device; when there is a conflict between the navigation paths of the plurality of moving devices 02, determine a moving device 02 that needs to preform avoidance; and control the moving device 02 that needs to preform avoidance to move into an avoidance area for parking.

The server 01 is further configured to: determine a target path direction for the moving device 02 that needs to preform avoidance, and determine a first candidate parking direction and a second candidate parking direction; and then determine, based on the target path direction, a target parking direction of the moving device 02 that needs to preform avoidance from the first candidate parking direction and the second candidate parking direction; and finally control, based on the target parking direction, the moving device 02 that needs to preform avoidance to be parked in the avoidance area.

It may be understood that the collision avoidance method for a moving device provided in this embodiment of the present application is applied to a scenario in which there is a conflict between the navigation paths of the plurality of moving devices 02. Unless otherwise explicitly specified, the moving devices 02 in the following description of the embodiments of the present application are all moving devices 02 that need to move into an avoidance area for parking and waiting.

In addition, in the collision avoidance system for a moving device shown in FIG. 1, the server 01 performs same processing on each moving device 02. In the following description of the embodiments of the present application, an example in which the server 01 performs processing on one moving device 02 is used for description.

Figure 2:
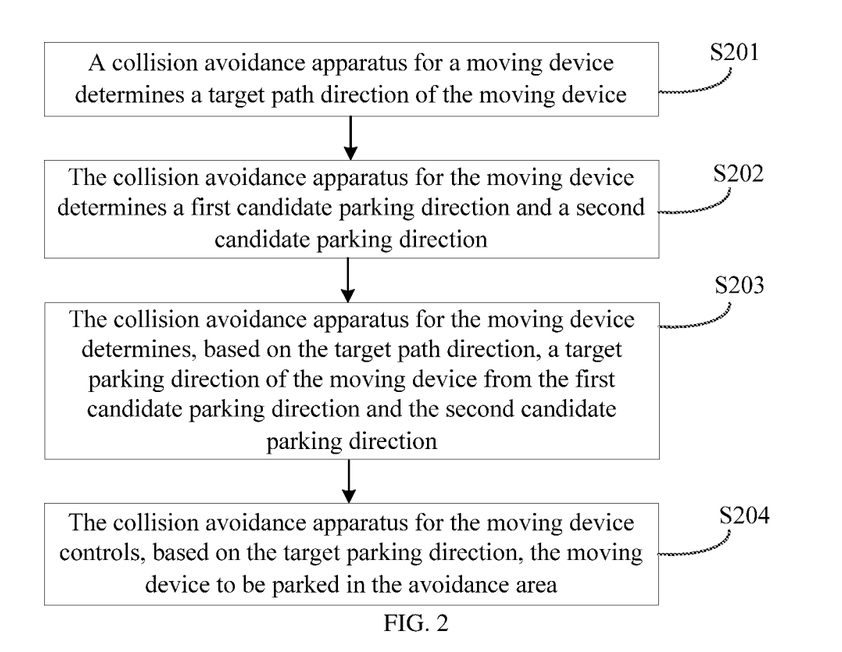
FIG. 2 is a schematic flowchart of a collision avoidance method for a moving device according to an embodiment of the present application.

FIG. 2 is a schematic flowchart of a collision avoidance method for a moving device according to an embodiment of the present application. The collision avoidance method may be performed by a moving device or the server in FIG. 1, and specifically may be performed by a processor of the moving device or the server.

Referring to FIG. 2, the collision avoidance method for a moving device according to this embodiment of the present application includes S201 to S204.

S201: A collision avoidance apparatus for a moving device determines a target path direction of the moving device.

The target path direction is a direction of a navigation path to be used after the moving device is parked in an avoidance area.

In a possible implementation, the collision avoidance apparatus for a moving device may plan a target path for the moving device according to a path algorithm, and then determine the target path direction based on a trend of the target path. For example, the collision avoidance apparatus for a moving device may determine the target path according to a path algorithm such as the Dynamic Window Approach (DWA) or the artificial potential field method. For example, taking the scenario diagram shown in FIG. 3 as an example, a trend of a target path of a moving device A is shown by the dotted line in FIG. 3. The collision avoidance apparatus for a moving device may determine a tangent direction of the target path at point P, namely, a direction indicated by the arrow D in FIG. 3 as the target path direction of the moving device A.

It may be understood that, for the method of determining the target path according to the path algorithm such as the DWA or artificial potential field method, reference may be made to the related description in the prior art. Details are not repeated herein.

S202: The collision avoidance apparatus for the moving device determines a first candidate parking direction and a second candidate parking direction.

At present, there are generally two types of avoidance areas for a moving device: a preset avoidance area near a wall and a fork. When the moving device is parked for avoidance in the preset avoidance area near a wall, since a length and width of the moving device are not necessarily equal, a movement direction may be along a short side or a long side. If a channel width of a preset movement area is too narrow, when the moving device is parked in the avoidance area, movement of another moving device may be affected. For example, in the scenario diagram shown in FIG. 4 or FIG. 5, the channel width is too narrow, and parking of the moving device A may affect movement of a moving device B. Therefore, optionally, in a possible implementation, the collision avoidance apparatus for a moving device may determine the first candidate parking direction and the second candidate parking direction based on the channel width of the preset movement area of the moving device and a boundary of the avoidance area.

The preset movement area may be an artificially predetermined movement area of a moving device. For example, when the collision avoidance method for a moving device provided in this embodiment of the present application is applied to a scenario such as a hotel, the preset movement area may be a corridor of the hotel.

It may be understood that, in actual application, the boundary of the avoidance area may be a wall or another type of obstacles, which is not limited in this embodiment of the present application.

It should be noted that, in this embodiment of the present application, when the avoidance area is the preset avoidance area near a wall, the avoidance area is within a range of the preset movement area. When the avoidance area is the fork, the avoidance area is not within a range of the preset movement area.

Figure 3:
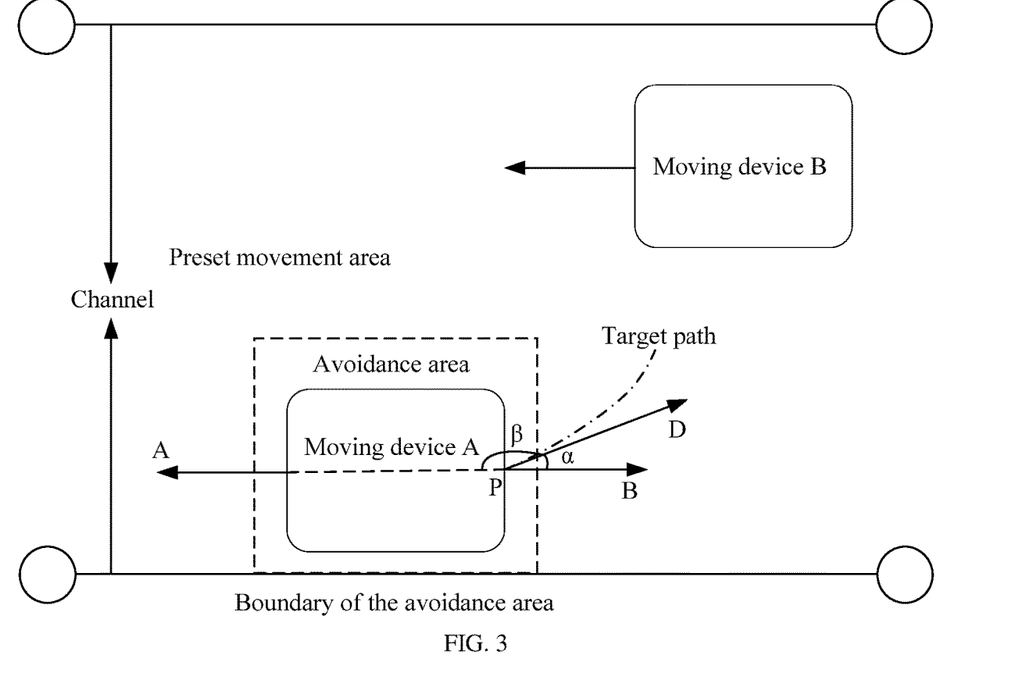
FIG. 3 is a schematic diagram of a scenario of an avoidance area according to an embodiment of the present application.

Optionally, in a possible implementation, when the channel width is greater than a preset length, the long and short sides of the moving device have no impact on parking of the moving device. The collision avoidance apparatus for a moving device may determine two different directions parallel to the boundary of the avoidance area as the first candidate parking direction and the second candidate parking direction, respectively. For example, referring to FIG. 3, a schematic diagram of a scenario of an avoidance area is provided. As shown in FIG. 3, two directions parallel to a boundary of the avoidance area are directions indicated by the arrow A and the arrow B, respectively. When determining that a moving device A is parked in the avoidance area in FIG. 3, the collision avoidance apparatus for a moving device may determine that the direction indicated by the arrow A is the first candidate parking direction, and the direction indicated by the arrow B is the second candidate parking direction. It can be seen that, when the avoidance area is within a range of a preset movement area, the boundary of the avoidance area may be a boundary of the preset movement area.

The preset length may be an artificially predetermined length.

In another possible implementation, when the channel width is less than or equal to the preset length, the long and short sides of the moving device have an impact on parking of the moving device. The collision avoidance apparatus for a moving device may determine the first candidate parking direction and the second candidate parking direction based on a positional relationship between a straight line where a physical long axis of the moving device is located and a straight line where a movement direction of the moving device is located.

Figure 4:
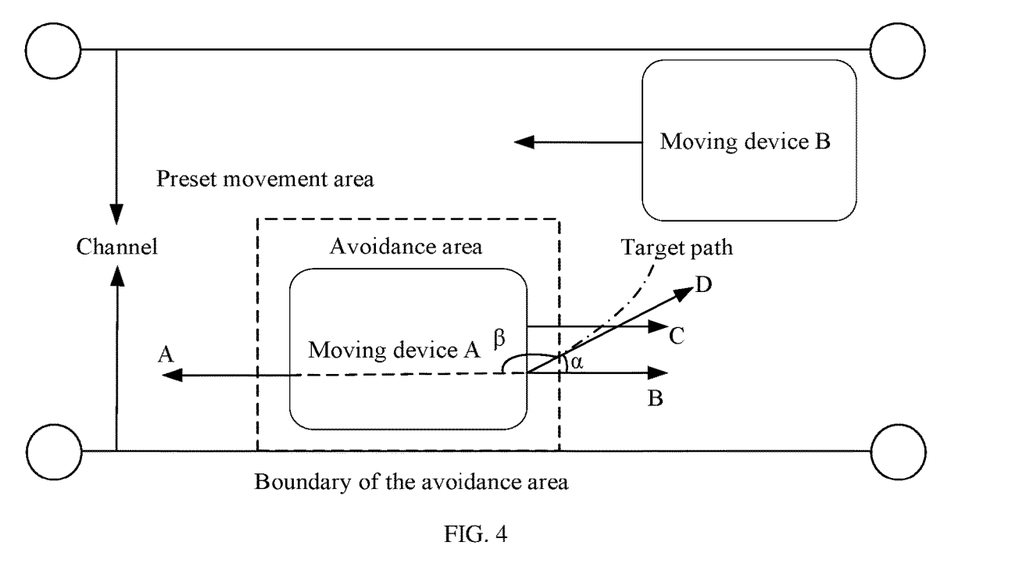
FIG. 4 is a schematic diagram of a scenario of another avoidance area according to an embodiment of the present application.

In a possible implementation, when a straight line where a physical long axis of the moving device is located and a straight line where the movement direction is located are parallel to each other, it indicates that the movement direction of the moving device is a forward direction of the short side of the moving device. In this case, the collision avoidance apparatus for a moving device may determine two different directions parallel to the boundary of the avoidance area as the first candidate parking direction and the second candidate parking direction, respectively. For example, referring to FIG. 4, a schematic diagram of a scenario of an avoidance area is provided. As shown in FIG. 4, a movement direction of the moving device A is a direction indicated by the arrow C, and a straight line where the arrow C is located is parallel to a straight line where a physical long axis of the moving device A is located. In this case, when determining that the moving device A is parked in the avoidance area in FIG. 4, the collision avoidance apparatus for a moving device may determine two different directions parallel to a boundary of the avoidance area, namely, directions indicated by the arrow A and the arrow B in FIG. 4, as the first candidate parking direction and the second candidate parking direction, respectively.

Figure 5:
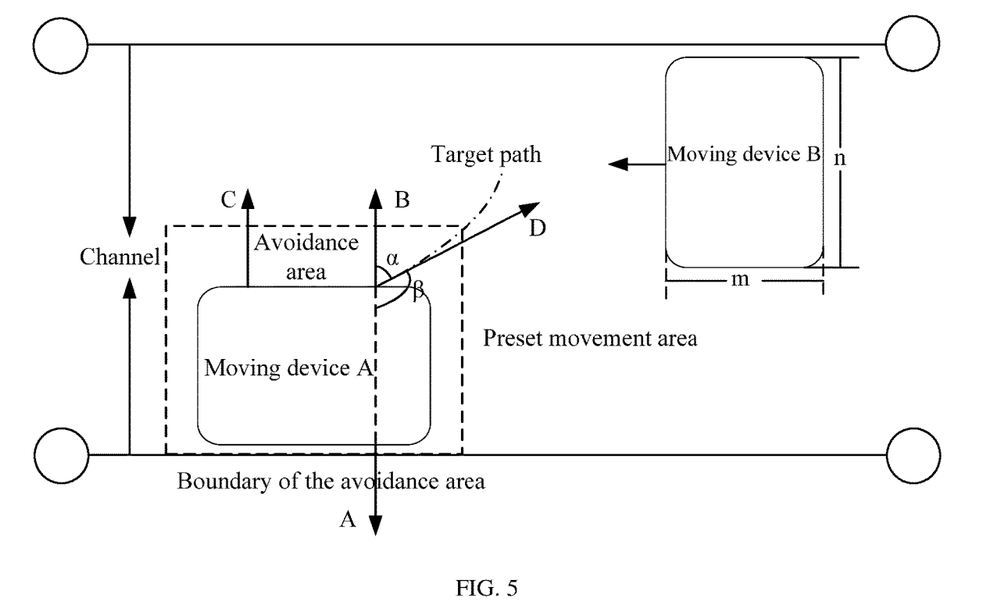
FIG. 5 is a schematic diagram of a scenario of still another avoidance area according to an embodiment of the present application.

In another possible implementation, when the straight line where the physical long axis of the moving device is located and the straight line where the movement direction is located are perpendicular to each other, it indicates that the movement direction of the moving device is a forward direction of the long side of the moving device. In this case, the collision avoidance apparatus for a moving device may determine two different directions perpendicular to the boundary of the avoidance area as the first candidate parking direction and the second candidate parking direction, respectively. Referring to FIG. 5, a schematic diagram of a scenario of an avoidance area is provided. As shown in FIG. 5, a movement direction of the moving device A is a direction indicated by the arrow C, and a straight line where the arrow C is located is perpendicular to a straight line where a physical long axis of the moving device A is located. In this case, when determining that the moving device A is parked in the avoidance area in FIG. 5, the collision avoidance apparatus for a moving device may determine two different directions perpendicular to a boundary of the avoidance area, namely, directions indicated by the arrow A and the arrow B in FIG. 5, as the first candidate parking direction and the second candidate parking direction, respectively.

Alternatively, the avoidance area of the moving device may be a fork. In this case, optionally, the collision avoidance apparatus for a moving device may first determine a target parking area, then identify a boundary, closest to the moving device, within the target parking area as a target boundary, and finally determine two different directions parallel to the target boundary as the first candidate parking direction and the second candidate parking direction, respectively.

The target parking area is the determined avoidance area, which does not belong to the range of the preset movement area.

Figure 6:
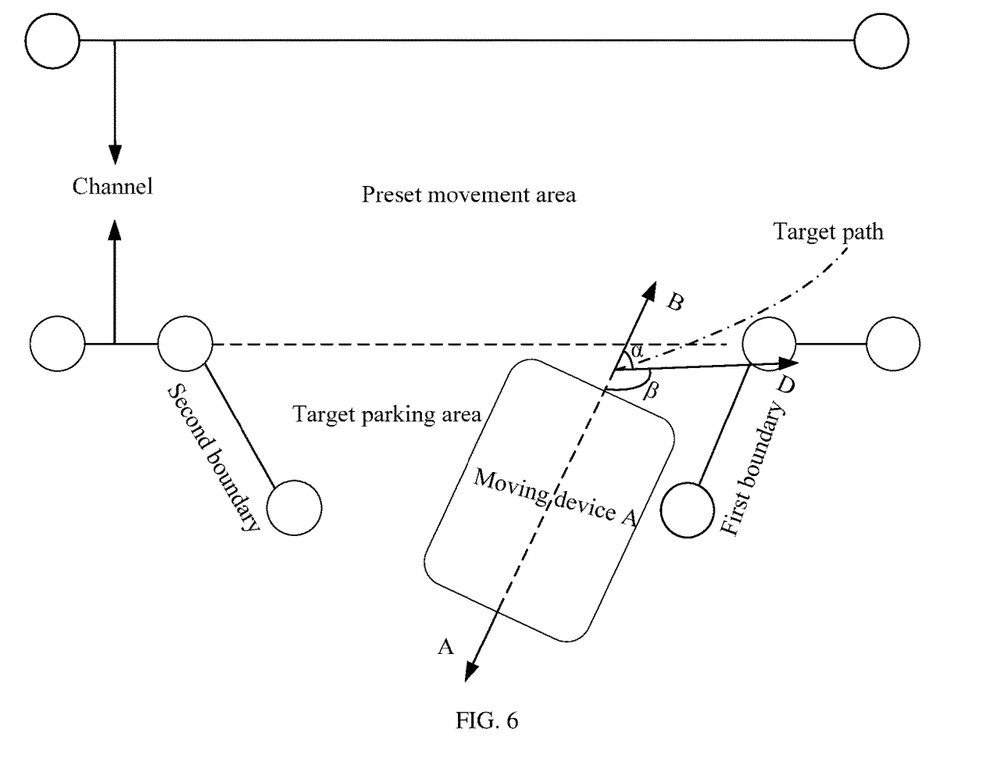
FIG. 6 is a schematic diagram of a scenario of yet another avoidance area according to an embodiment of the present application.

For example, referring to FIG. 6, a schematic diagram of a scenario of an avoidance area is provided. A target parking area determined by the collision avoidance apparatus for a moving device is shown in FIG. 6, and the target parking area has two boundaries, namely, a first boundary and a second boundary in FIG. 6. The collision avoidance apparatus for a moving device identifies that a boundary, closest to the moving device, within the target parking area is the first boundary, and then the first boundary is used as a target boundary. Then the collision avoidance apparatus for a moving device may determine two different directions (namely, directions indicated by the arrow A and the arrow B) parallel to the first boundary as the first candidate parking direction and the second candidate parking direction, respectively.

S203: The collision avoidance apparatus for the moving device determines, based on the target path direction, a target parking direction of the moving device from the first candidate parking direction and the second candidate parking direction.

Optionally, the collision avoidance apparatus for a moving device may first determine a first direction angle and a second direction angle, and then determine, based on the first direction angle and the second direction angle, the target parking direction from the first candidate parking direction and the second candidate parking direction.

The first direction angle is an angle between the first candidate parking direction and the target path direction, and the second direction angle is an angle between the second candidate parking direction and the target path direction.

Optionally, when the first direction angle is less than the second direction angle, the collision avoidance apparatus for a moving device determines that the first candidate parking direction is the target parking direction; when the first direction angle is greater than the second direction angle, the collision avoidance apparatus for a moving device determines that the second candidate parking direction is the target parking direction; and when the first direction angle is equal to the second direction angle, the collision avoidance apparatus for a moving device determines that the first candidate parking direction or the second candidate parking direction is the target parking direction.

For example, in the schematic diagram of the scenario of the avoidance area shown in FIG. 3, the direction indicated by the arrow A is the first candidate parking direction, the direction indicated by the arrow B is the second candidate parking direction, and the direction indicated by the arrow D is the target path direction. In this case, the collision avoidance apparatus for a moving device may determine an angle between the direction indicated by the arrow A and the direction indicated by the arrow D, namely, an angle β in FIG. 3, as the first direction angle, and an angle between the direction indicated by the arrow B and the direction indicated by the arrow D, namely, an angle α in FIG. 3, as the second direction angle. It can be seen in FIG. 3 that, the angle α is less than the angle β, that is, the first direction angle is greater than the second direction angle. In this case, the collision avoidance apparatus for a moving device may determine the direction indicated by the arrow B, namely, the second candidate parking direction, as the target parking direction.

In the schematic diagram of the scenario of the avoidance area shown in FIG. 4, the direction indicated by the arrow A is the first candidate parking direction, the direction indicated by the arrow B is the second candidate parking direction, and the direction indicated by the arrow D is the target path direction. In this case, the collision avoidance apparatus for a moving device may determine an angle between the direction indicated by the arrow A and the direction indicated by the arrow D, namely, an angle β in FIG. 4, as the first direction angle, and an angle between the direction indicated by the arrow B and the direction indicated by the arrow D, namely, an angle α in FIG. 4, as the second direction angle. It can be seen in FIG. 4 that, the angle α is less than the angle β, that is, the first direction angle is greater than the second direction angle. In this case, the collision avoidance apparatus for a moving device may determine the direction indicated by the arrow B, namely, the second candidate parking direction, as the target parking direction.

In the schematic diagram of the scenario of the avoidance area shown in FIG. 5, the direction indicated by the arrow A is the first candidate parking direction, the direction indicated by the arrow B is the second candidate parking direction, and the direction indicated by the arrow D is the target path direction. In this case, the collision avoidance apparatus for a moving device may determine an angle between the direction indicated by the arrow A and the direction indicated by the arrow D, namely, an angle β in FIG. 5, as the first direction angle, and an angle between the direction indicated by the arrow B and the direction indicated by the arrow D, namely, an angle α in FIG. 5, as the second direction angle. It can be seen in FIG. 5 that, the angle α is less than the angle β, that is, the first direction angle is greater than the second direction angle. In this case, the collision avoidance apparatus for a moving device may determine the direction indicated by the arrow B, namely, the second candidate parking direction, as the target parking direction.

Specifications of a plurality of moving devices in a same application scenario are generally the same. Optionally, a sum of a physical short axis and a physical long axis of a moving device may be determined as the preset length. In this way, when a channel width is less than or equal to the preset length, and a straight line where the physical long axis of the moving device is located and a straight line where a movement direction is located are perpendicular to each other (namely, a case shown in the schematic diagram of the scenario shown in FIG. 5), if two moving devices meet face to face in a preset movement area, only one moving device may move into an avoidance area to adjust a parking direction, and the other moving device may move along an original movement direction. For example, when the moving device A is parked in the avoidance area in a direction shown in FIG. 5, the moving device B may keep moving without adjusting a direction for avoidance. For example, as shown in FIG. 5, a physical short axis of the moving device B is a side length m in a direction parallel to the boundary of the avoidance area, and the physical long axis is a side length n in a direction perpendicular to the boundary of the avoidance area.

In the schematic diagram of the scenario of the avoidance area shown in FIG. 6, the direction indicated by the arrow A is the first candidate parking direction, the direction indicated by the arrow B is the second candidate parking direction, and the direction indicated by the arrow D is the target path direction. In this case, the collision avoidance apparatus for a moving device may determine an angle between the direction indicated by the arrow A and the direction indicated by the arrow D, namely, an angle β in FIG. 6, as the first direction angle, and an angle between the direction indicated by the arrow B and the direction indicated by the arrow D, namely, an angle α in FIG. 6, as the second direction angle. It can be seen in FIG. 6 that, the angle α is less than the angle β, that is, the first direction angle is greater than the second direction angle. In this case, the collision avoidance apparatus for a moving device may determine the direction indicated by the arrow B, namely, the second candidate parking direction, as the target parking direction.

S204. The collision avoidance apparatus for the moving device controls, based on the target parking direction, the moving device to be parked in the avoidance area.

Optionally, after determining the target parking direction, the collision avoidance apparatus for a moving device may control the moving device to be parked in the avoidance area with a movement direction toward the target parking direction.

Taking the schematic diagram of the scenario of the avoidance area shown in FIG. 3 as an example, the target parking direction determined by the collision avoidance apparatus for a moving device is the direction indicated by arrow B, and there is a small angle difference between the direction indicated by arrow B and the target path direction. When the moving device A is parked in the avoidance area, and the movement direction is toward the direction indicated by the arrow B, after parking of the moving device A in the avoidance area completes, the moving device A may quickly adjust its body from the direction indicated by the arrow B to the target path direction. Instead, when the moving device A is parked in the avoidance area, and the movement direction is toward the direction indicated by the arrow A, after parking of the moving device A in the avoidance area completes, the moving device A needs to adjust itself to a larger angle before being adjusted to the target path direction. Therefore, the collision avoidance method for a moving device provided in this embodiment of the present application may reduce a startup time used by the moving device after the avoidance completes.

According to the collision avoidance method for a moving device provided in this embodiment of the present application, a direction of a moving device used when the moving device is parked in an avoidance area (namely, the target parking direction in the present application) is determined based on a target path direction, and the target path direction is a direction of a navigation path to be used after the moving device is parked in the avoidance area. Therefore, according to the technical solution of the present application, a target parking direction that matches the direction of the navigation path may be determined from two candidate parking directions, that is, there is a relatively small angle difference between the direction of the navigation path and the target parking direction. In this way, after the moving device is parked in the avoidance area, the moving device may quickly adjust its body to the direction of the navigation path. Therefore, the collision avoidance method for a moving device provided in the present application may reduce a startup time used by the moving device after the avoidance completes.

Figure 7:
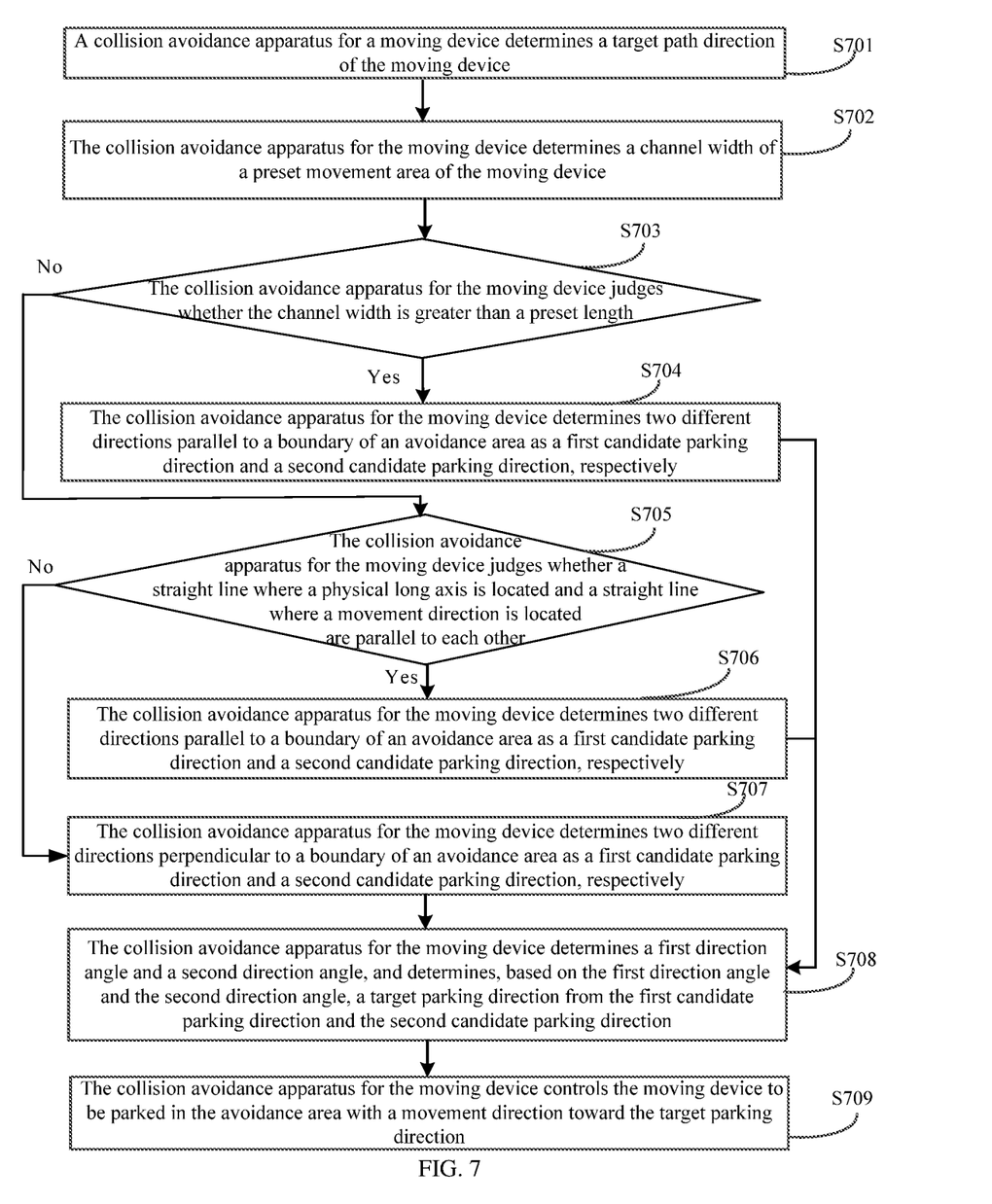
FIG. 7 is a schematic flowchart of another collision avoidance method for a moving device according to an embodiment of the present application.

FIG. 7 is a schematic flowchart of another collision avoidance method for a moving device according to an embodiment of the present application.

As shown in FIG. 7, the collision avoidance method includes S701 to S7010.

S701: A collision avoidance apparatus for a moving device determines a target path direction of the moving device.

S702: The collision avoidance apparatus for the moving device determines a channel width of a preset movement area of the moving device.

S703: The collision avoidance apparatus for the moving device judges whether the channel width is greater than a preset length.

When determining that the channel width is greater than the preset length, the collision avoidance apparatus for a moving device performs S704. When determining that the channel width is less than or equal to the preset length, the collision avoidance apparatus for a moving device performs S705.

S704: The collision avoidance apparatus for the moving device determines two different directions parallel to a boundary of an avoidance area as a first candidate parking direction and a second candidate parking direction, respectively.

After performing S704, the collision avoidance apparatus for a moving device performs S708.

S705: The collision avoidance apparatus for the moving device judges whether a straight line where a physical long axis is located and a straight line where a movement direction is located are parallel to each other.

When determining that the straight line where the physical long axis is located and the straight line where the movement direction is located are parallel to each other, the collision avoidance apparatus for a moving device performs S706. When determining that the straight line where the physical long axis is located and the straight line where the movement direction is located are not parallel to each other, that is, the straight line where the physical long axis is located and the straight line where the movement direction is located are perpendicular to each other, the collision avoidance apparatus for a moving device performs S707.

S706: The collision avoidance apparatus for the moving device determines two different directions parallel to a boundary of an avoidance area as a first candidate parking direction and a second candidate parking direction, respectively.

After performing S706, the collision avoidance apparatus for a moving device performs S708.

S707: The collision avoidance apparatus for the moving device determines two different directions perpendicular to a boundary of an avoidance area as a first candidate parking direction and a second candidate parking direction, respectively.

After performing S707, the collision avoidance apparatus for a moving device performs S708.

S708: The collision avoidance apparatus for the moving device determines a first direction angle and a second direction angle, and determines, based on the first direction angle and the second direction angle, a target parking direction from the first candidate parking direction and the second candidate parking direction.

S709: The collision avoidance apparatus for the moving device controls the moving device to be parked in the avoidance area with a movement direction toward the target parking direction.

Figure 8:
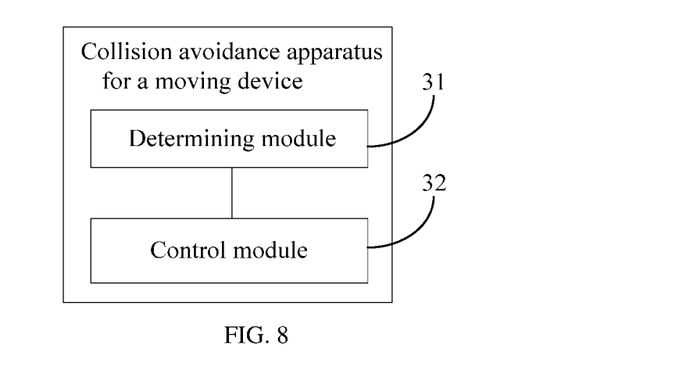
FIG. 8 is a schematic structural diagram of a collision avoidance apparatus for a moving device according to an embodiment of the present application.

FIG. 8 is a schematic structural diagram of a collision avoidance apparatus for a moving device according to an embodiment of the present application.

As shown in FIG. 8, the collision avoidance apparatus for a moving device may be the server 01 in the collision avoidance system for a moving device shown in FIG. 1 in the foregoing embodiment, or may be a moving device itself. The collision avoidance apparatus for a moving device includes a determining module 31 and a control module 32.

The determining module 31 performs S201, S202, and S203 in the foregoing method embodiment, and the control module 32 performs S204 in the foregoing method embodiment.

Specifically, the determining module 31 is configured to determine a target path direction of a moving device. The target path direction is a direction of a navigation path to be used after the moving device is parked in an avoidance area.

The determining module 31 is further configured to determine a first candidate parking direction and a second candidate parking direction.

The determining module 31 is further configured to determine, based on the target path direction, a target parking direction of the moving device from the first candidate parking direction and the second candidate parking direction.

The control module 32 is configured to control, based on the target parking direction determined by the determining module 31, the moving device to be parked in the avoidance area.

Optionally, the determining module 31 is specifically configured to: determine a channel width of a preset movement area of the moving device; and determine the first candidate parking direction and the second candidate parking direction based on a boundary of the avoidance area and the channel width, where the avoidance area belongs to a range of the preset movement area.

Optionally, the determining module 31 is further specifically configured to: when it is determined that the channel width is greater than a preset length, determine two different directions parallel to the boundary of the avoidance area as the first candidate parking direction and the second candidate parking direction, respectively.

Optionally, the determining module 31 is further specifically configured to: when it is determined that the channel width is less than or equal to a preset length, determine the first candidate parking direction and the second candidate parking direction based on a positional relationship between a straight line where a physical long axis of the moving device is located and a straight line where a movement direction of the moving device is located.

Optionally, the determining module 31 is further specifically configured to: when the straight line where the physical long axis is located and the straight line where the movement direction is located are parallel to each other, determine two different directions parallel to the boundary of the avoidance area as the first candidate parking direction and the second candidate parking direction, respectively.

Optionally, the determining module 31 is further specifically configured to: when the straight line where the physical long axis is located and the straight line where the movement direction is located are perpendicular to each other, determine two different directions perpendicular to the boundary of the avoidance area as the first candidate parking direction and the second candidate parking direction, respectively.

Optionally, the determining module 31 is further specifically configured to: determine a target parking area, where the target parking area does not belong to a range of a preset movement area; identify a target boundary, where the target boundary is a boundary, closest to the moving device, within the target parking area; and determine two different directions parallel to the target boundary as the first candidate parking direction and the second candidate parking direction, respectively.

Optionally, the control module 32 is specifically configured to control the moving device to be parked in the avoidance area with a movement direction toward the target parking direction.

Optionally, the determining module 31 is further specifically configured to: determine a first direction angle and a second direction angle, where the first direction angle is an angle between the first candidate parking direction and the target path direction, and the second direction angle is an angle between the second candidate parking direction and the target path direction; and determine, based on the first direction angle and the second direction angle, the target parking direction from the first candidate parking direction and the second candidate parking direction.

Optionally, the determining module 31 is further specifically configured to: when the first direction angle is less than the second direction angle, determine that the first candidate parking direction is the target parking direction; when the first direction angle is greater than the second direction angle, determine that the second candidate parking direction is the target parking direction; and when the first direction angle is equal to the second direction angle, determine that the first candidate parking direction or the second candidate parking direction is the target parking direction.

Optionally, the collision avoidance apparatus for a moving device may further include a storage module. The storage module is configured to store program code and the like of the collision avoidance apparatus for a moving device.

Figure 9:
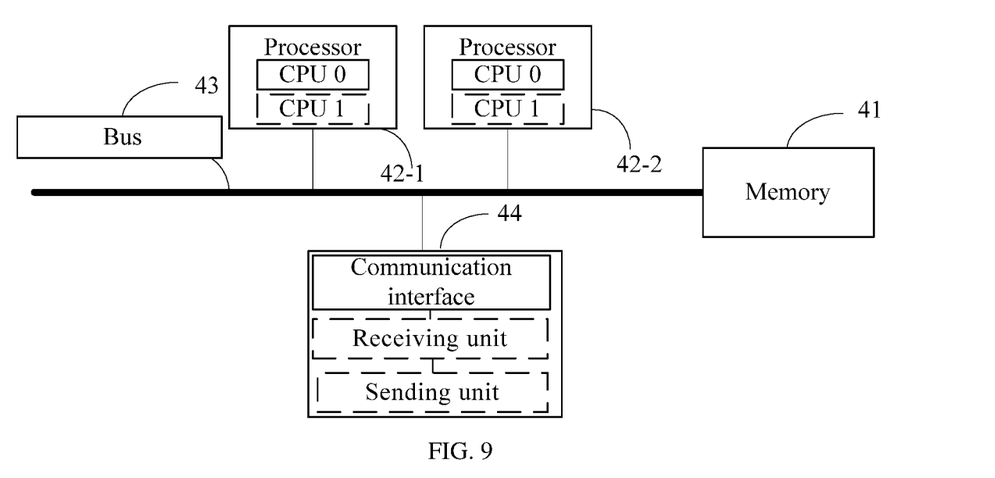
FIG. 9 is a schematic structural diagram of another collision avoidance apparatus for a moving device according to an embodiment of the present application.

FIG. 9 is a schematic structural diagram of another collision avoidance apparatus for a moving device according to an embodiment of the present application.

As shown in FIG. 9, the avoidance apparatus includes a memory 41, processors 42, a bus 43, and a communications interface 44. The memory 41 is configured to store computer executable instructions, and the processors 42 and the memory 41 are connected through the bus 43. When the collision avoidance apparatus for a moving device runs, the processors 42 execute the computer executable instructions stored in the memory 41, so that the collision avoidance apparatus for a moving device performs the collision avoidance method for a moving device provided in the foregoing embodiments.

In a specific implementation, as an embodiment, the processors 42 (42-1 and 42-2) may include one or more Central Processing Unit (CPU), for example, CPU 0 and CPU 1 shown in FIG. 9. Moreover, as an embodiment, the collision avoidance apparatus for a moving device may include a plurality of processors 42, such as the processor 42-1 and the processor 42-2 shown in FIG. 9. Each CPU in these processors 42 may be a single-core processor (single-CPU) or a multi-core processor (multi-CPU). The processors 42 herein may refer to one or more devices, circuits, and/or processing cores for processing data (such as computer program instructions).

The memory 41 may be, but not limited to, a Read-Only Memory 41 (ROM) or another type of static storage device that may store static information and instructions; or a Random Access Memory (RAM) or another type of dynamic storage device that may store information and instructions; or an Electrically Erasable Programmable Read-Only Memory (EEPROM), a Compact Disc Read-Only Memory (CD-ROM), or another optical disc memory (including a compact disc, a laser disc, an optical disc, a digital versatile disc, a Blu-ray discs, and the like), a magnetic disk storage medium or another magnetic storage device; or any other medium that can be accessed by a computer and used to carry or store desired program code in a form of instructions or data structures. The memory 41 may exist independently, and is connected to the processor 42 through the bus 43. The memory 41 may alternatively be integrated with the processors 42.

In a specific implementation, the memory 41 is configured to store data in the present application and execute computer execution instructions corresponding to software programs in the present application. The processor 42 may implement various functions of the collision avoidance apparatus for a moving device by running or executing the software programs stored in the memory 41, and calling the data stored in the memory 41.

The communications interface 44 uses any transceiver apparatus to communicate with other devices or communication networks, such as a control system, a Radio Access Network (RAN), and a Wireless Local Area Network (WLAN). The communications interface 44 may include a receiving unit to implement a receiving function, and a sending unit to implement a sending function.

The bus 43 may be an Industry Standard Architecture (ISA) bus, a Peripheral Component Interconnect (PCI) bus, an Extended Industry Standard Architecture (EISA) bus, or the like. The bus 43 may be classified into an address bus, a data bus, a control bus, and the like. For ease of representation, only one thick line is used to represent the communications bus in FIG. 9, but this does not mean that there is only one bus or only one type of bus.

As an example, in combination with FIG. 8, the functions implemented by the determining module in the collision avoidance apparatus for a moving device are the same as those implemented by the processor in FIG. 9, and the functions implemented by the storage module in the collision avoidance apparatus for a moving device are the same as those of the memory in FIG. 9.

For explanation of related content in the present embodiment, reference may be made to the foregoing method embodiments. Details are not described herein again.

Optionally, the collision avoidance apparatus for a moving device may further include a transceiver. The transceiver is configured to: under the control of the processor of the collision avoidance apparatus for a moving device, perform steps of sending and receiving data, signaling or information, for example, obtain a target path direction.

Optionally, the collision avoidance apparatus for a moving device may be a moving device itself, or part of apparatus in a moving device, for example, may be a chip system in the moving device. The chip system is configured to support the collision avoidance apparatus for a moving device in implementing functions involved in the first aspect, for example, receiving, sending or processing data and/or information involved in the collision avoidance method for a moving device. The chip system includes a chip, or may include another discrete device or circuit structure.

Optionally, the collision avoidance apparatus for a moving device may alternatively be a server communicatively connected to a moving device, or may be part of apparatus in the server, for example, may be a chip system in the server.

Through the description of the foregoing implementations, those skilled in the art may clearly understand that for the purpose of convenient and brief description, the division of the foregoing function modules are only used as an example for illustration. In actual application, the foregoing functions may be allocated to different function modules for implementation as required, that is, an inner structure of an apparatus is divided into different function modules to implement all or a part of the functions described above. For a detailed working process of the foregoing system, apparatus, and unit, reference may be made to a corresponding process in the foregoing method embodiments, and details are not described herein again.

An embodiment of the present application further provides a computer-readable storage medium. The computer-readable storage medium stores instructions. When executing the instructions, a computer performs the collision avoidance method for a moving device provided in the foregoing embodiments.

The computer-readable storage medium may be, for example, but not limited to, an electronic, magnetic, optical, electromagnetic, infrared, or semiconductor system, apparatus, or means, or any combination thereof. More specific examples (a non-exhaustive list) of the computer-readable storage medium include: an electrical connection having one or more wires, a portable computer disk, a hard disk, an RAM, an ROM, an Erasable Programmable Read Only Memory (EPROM), a register, an optical fiber, a CD-ROM, an optical storage means, a magnetic storage means, or any suitable combination thereof, or a computer-readable storage medium of any other form known in the art. An exemplary storage medium is coupled to the processor, so that the processor can read information from the storage medium and can write information into the storage medium. Certainly, the storage medium may also be an integral part of the processor. The processor and the storage medium may be located in Application Specific Integrated Circuits (ASIC). In this embodiment of the present application, the computer-readable storage medium may be any tangible medium including or storing a program, and the program may be used by or used in combination with an instruction execution system, apparatus or means.

An embodiment of the present application further provides a computer program product, including a computer program. When executed by a processor, the computer program implements any one of the collision avoidance methods for a moving device.

The computer program product may write computer program code in one or more programming languages or combinations thereof for performing operations of the embodiments of the present application. The programming language includes an object oriented programming language such as Java and C++, and conventional procedural programming language, such as the "C" language or a similar programming language. The program code may be executed fully on a user computing device, executed partially on a user computing device, executed as an independent software package, executed partially on a user computing device and partially on a remote computing device, or executed fully on a remote computing device or a server.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces.

The indirect couplings or communication connections between the devices or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, functional units in the embodiments of the present disclosure may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such understanding, the technical solution of the present application which is essential or a part contributing to the prior art or a part of the technical solution may be embodied in the form of a software product. The computer software product is stored in a storage medium and includes a plurality of instructions for enabling a computer device (which may be a personal computer, a server, a network device, or the like) to execute all or some steps of the method according to each embodiment of the present application. The foregoing storage medium includes various mediums that may store a program code, such as a USB flash drive, a mobile hard disk, a Read-only Memory (ROM), a Random Access Memory (RAM), a magnetic disk, or an optical disk.

In addition, it should be further noted that, a combination of the technical features in the present application is not limited to the combinations described in the claims of the present application or the combinations described in specific embodiments of the present application. All the technical features described in the present application can be combined in any suitable form if such combination is not contradictory.

It should be noted that, the foregoing descriptions are only specific embodiments of the present application. Apparently, the present application is not limited to the foregoing embodiments, and there are various similar variations. All modifications directly derived or conceived by a person skilled in the art from the content disclosed in the present application should fall within the protection scope of the present application.

It should be understood that the terms "first", "second", and the like used in the embodiments of the present application are merely for clear description of the technical solutions of the embodiments of the present application, rather than limiting the protection scope of the present application.

The foregoing descriptions are merely specific implementations of the present application, but are not intended to limit the protection scope of the present application. Any modifications or replacements within the disclosed technical scope of the present application shall fall within the protection scope of the present application. Therefore, the protection scope of present application shall be subject to the protection scope of the claims.

What is claimed is:

1. A collision avoidance method for a moving device, comprising:
    determining a target path direction of a moving device, wherein the target path direction is a direction of a navigation path to be used after the moving device is parked in an avoidance area;
    determining a first candidate parking direction and a second candidate parking direction;
    determining, based on the target path direction, a target parking direction of the moving device from the first candidate parking direction and the second candidate parking direction; and
    controlling, based on the target parking direction, the moving device to be parked in the avoidance area,
    wherein the determining, based on the target path direction, a target parking direction of the moving device from the first candidate parking direction and the second candidate parking direction comprises:
    determining a first direction angle and a second direction angle, wherein the first direction angle is an angle between the first candidate parking direction and the target path direction, and the second direction angle is an angle between the second candidate parking direction and the target path direction; and
    determining, based on the first direction angle and the second direction angle, the target parking direction from the first candidate parking direction and the second candidate parking direction,
    wherein the determining, based on the first direction angle and the second direction angle, the target parking direction from the first candidate parking direction and the second candidate parking direction comprises:
    when the first direction angle is less than the second direction angle, determining that the first candidate parking direction is the target parking direction;
    when the first direction angle is greater than the second direction angle, determining that the second candidate parking direction is the target parking direction; and
    when the first direction angle is equal to the second direction angle, determining that the first candidate parking direction or the second candidate parking direction is the target parking direction.

2. The collision avoidance method for a moving device according to claim 1, wherein the determining a first candidate parking direction and a second candidate parking direction comprises:
    determining a channel width of a preset movement area of the moving device; and
    determining the first candidate parking direction and the second candidate parking direction based on a boundary of the avoidance area and the channel width, wherein the avoidance area belongs to a range of the preset movement area.

3. The collision avoidance method for a moving device according to claim 2, wherein the determining the first candidate parking direction and the second candidate parking direction based on a boundary of the avoidance area and the channel width comprises:
    when it is determined that the channel width is greater than a preset length, determining two different directions parallel to the boundary of the avoidance area as the first candidate parking direction and the second candidate parking direction, respectively.

4. The collision avoidance method for a moving device according to claim 2, wherein the determining the first candidate parking direction and the second candidate parking direction based on a boundary of the avoidance area and the channel width comprises:

when it is determined that the channel width is less than or equal to a preset length, determining the first candidate parking direction and the second candidate parking direction based on a positional relationship between a straight line where a physical long axis of the moving device is located and a straight line where a movement direction of the moving device is located.

5. The collision avoidance method for a moving device according to claim 4, wherein the determining the first candidate parking direction and the second candidate parking direction based on a positional relationship between a straight line where a physical long axis of the moving device is located and a straight line where a movement direction of the moving device is located comprises:

when the straight line where the physical long axis is located and the straight line where the movement direction is located are parallel to each other, determining two different directions parallel to the boundary of the avoidance area as the first candidate parking direction and the second candidate parking direction, respectively.

6. The collision avoidance method for a moving device according to claim 4, wherein the determining the first candidate parking direction and the second candidate parking direction based on a positional relationship between a straight line where a physical long axis of the moving device is located and a straight line where a movement direction of the moving device is located comprises:

when the straight line where the physical long axis is located and the straight line where the movement direction is located are perpendicular to each other, determining two different directions perpendicular to the boundary of the avoidance area as the first candidate parking direction and the second candidate parking direction, respectively.

7. The collision avoidance method for a moving device according to claim 1, wherein the determining a first candidate parking direction and a second candidate parking direction comprises:

determining a target parking area, wherein the target parking area does not belong to a range of a preset movement area;

identifying a target boundary, wherein the target boundary is a boundary, closest to the moving device, within the target parking area; and determining two different directions parallel to the target boundary as the first candidate parking direction and the second candidate parking direction, respectively.

8. The collision avoidance method for a moving device according to claim 1, wherein the controlling, based on the target parking direction, the moving device to be parked in the avoidance area comprises:

controlling the moving device to be parked in the avoidance area with a movement direction toward the target parking direction.

9. The collision avoidance method for a moving device according to claim 1, wherein the determining a target path direction of a moving device comprises:

planning a target path for the moving device according to a path algorithm; and determining the target path direction based on a trend of the target path.

10. A collision avoidance apparatus for a moving device, comprising: a memory, a processor, a bus and a communications interface, wherein the memory is configured to store computer executable instructions, and the processor and the memory are connected through the bus; and when the collision avoidance apparatus for a moving device is running, the processor executes the computer executable instructions stored in the memory, so that the collision avoidance apparatus for a moving device performs a collision avoidance method for a moving device, comprising:

determining a target path direction of a moving device, wherein the target path direction is a direction of a navigation path to be used after the moving device is parked in an avoidance area;

determining a first candidate parking direction and a second candidate parking direction;

determining, based on the target path direction, a target parking direction of the moving device from the first candidate parking direction and the second candidate parking direction; and controlling, based on the target parking direction determined by the determining module, the moving device to be parked in the avoidance area, wherein the determining, based on the target path direction, a target parking direction of the moving device from the first candidate parking direction and the second candidate parking direction comprises:

determining a first direction angle and a second direction angle, wherein the first direction angle is an angle between the first candidate parking direction and the target path direction, and the second direction angle is an angle between the second candidate parking direction and the target path direction; and determining, based on the first direction angle and the second direction angle, the target parking direction from the first candidate parking direction and the second candidate parking direction, wherein the determining, based on the first direction angle and the second direction angle, the target parking direction from the first candidate parking direction and the second candidate parking direction comprises:

when the first direction angle is less than the second direction angle, determining that the first candidate parking direction is the target parking direction;

when the first direction angle is greater than the second direction angle, determining that the second candidate parking direction is the target parking direction; and when the first direction angle is equal to the second direction angle, determining that the first candidate parking direction or the second candidate parking direction is the target parking direction.

11. The collision avoidance apparatus for a moving device according to claim 10, wherein the determining a first candidate parking direction and a second candidate parking direction comprises:

determining a channel width of a preset movement area of the moving device; and determining the first candidate parking direction and the second candidate parking direction based on a boundary of the avoidance area and the channel width, wherein the avoidance area belongs to a range of the preset movement area.

12. The collision avoidance apparatus for a moving device according to claim 11, wherein the determining the first candidate parking direction and the second candidate parking direction based on a boundary of the avoidance area and the channel width comprises:

when it is determined that the channel width is greater than a preset length, determining two different directions parallel to the boundary of the avoidance area as the first candidate parking direction and the second candidate parking direction, respectively.

13. The collision avoidance apparatus for a moving device according to claim 11, wherein the determining the first candidate parking direction and the second candidate parking direction based on a boundary of the avoidance area and the channel width comprises:

when it is determined that the channel width is less than or equal to a preset length, determining the first candidate parking direction and the second candidate parking direction based on a positional relationship between a straight line where a physical long axis of the moving device is located and a straight line where a movement direction of the moving device is located.

14. The collision avoidance apparatus for a moving device according to claim 13, wherein the determining the first candidate parking direction and the second candidate parking direction based on a positional relationship between a straight line where a physical long axis of the moving device is located and a straight line where a movement direction of the moving device is located comprises:

when the straight line where the physical long axis is located and the straight line where the movement direction is located are parallel to each other, determining two different directions parallel to the boundary of the avoidance area as the first candidate parking direction and the second candidate parking direction, respectively.

15. The collision avoidance apparatus for a moving device according to claim 13, wherein the determining the first candidate parking direction and the second candidate parking direction based on a positional relationship between a straight line where a physical long axis of the moving device is located and a straight line where a movement direction of the moving device is located comprises:

when the straight line where the physical long axis is located and the straight line where the movement direction is located are perpendicular to each other, determining two different directions perpendicular to the boundary of the avoidance area as the first candidate parking direction and the second candidate parking direction, respectively.

16. The collision avoidance apparatus for a moving device according to claim 10, wherein the determining a first candidate parking direction and a second candidate parking direction comprises:

determining a target parking area, wherein the target parking area does not belong to a range of a preset movement area;

identifying a target boundary, wherein the target boundary is a boundary, closest to the moving device, within the target parking area; and determining two different directions parallel to the target boundary as the first candidate parking direction and the second candidate parking direction, respectively.

17. The collision avoidance apparatus for a moving device according to claim 10, wherein the controlling, based on the target parking direction determined by the determining module, the moving device to be parked in the avoidance area comprises:

controlling the moving device to be parked in the avoidance area with a movement direction toward the target parking direction.

18. A non-transitory computer-readable storage medium, wherein the non-transitory computer-readable storage medium stores instructions, and when executing the instructions, a computer performs the collision avoidance method for a moving device according to claim 1.

\* \* \* \* \*